United States Patent
Rick et al.

(10) Patent No.: US 7,620,029 B2
(45) Date of Patent: Nov. 17, 2009

(54) PARALLEL CELL ID ACQUISITION IN FREQUENCY DIVISION MULTIPLE ACCESS SYSTEMS

(75) Inventors: Roland Rick, San Diego, CA (US); David Pandian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 755 days.

(21) Appl. No.: 10/683,640

(22) Filed: Oct. 9, 2003

(65) Prior Publication Data

US 2005/0078654 A1    Apr. 14, 2005

(51) Int. Cl.
*H04B 7/208* (2006.01)
*H04B 7/00* (2006.01)

(52) U.S. Cl. .............. 370/344; 370/319; 370/329; 455/525

(58) Field of Classification Search ........... 370/319, 370/328, 329, 331, 332, 344; 455/436, 450, 455/500, 502, 509, 515, 516, 524, 525; 375/356
See application file for complete search history.

(56) References Cited

U.S. PATENT DOCUMENTS

| | | | |
|---|---|---|---|
| 5,168,575 A * | 12/1992 | Cizek et al. | 455/514 |
| 5,379,446 A | 1/1995 | Murase | |
| 5,640,677 A | 6/1997 | Karlsson | |
| 5,673,260 A * | 9/1997 | Umeda et al. | 370/342 |
| 5,740,536 A | 4/1998 | Benveniste et al. | |
| 5,867,785 A * | 2/1999 | Averbuch et al. | 455/436 |
| 6,101,383 A | 8/2000 | Poon | |
| 6,169,759 B1 * | 1/2001 | Kanterakis et al. | 370/342 |
| 6,175,794 B1 | 1/2001 | Desgane et al. | |
| 6,327,469 B1 * | 12/2001 | Gaastra | 455/436 |
| 6,351,461 B1 * | 2/2002 | Sakoda et al. | 370/335 |

(Continued)

FOREIGN PATENT DOCUMENTS

EP    1005181    5/2000

(Continued)

OTHER PUBLICATIONS

Digital Cellular Telecommunications System (Phase 2+); Radio Subsystem Link Control (Oct. 2000) ETSI TS 100 911 V8.5.0 pp. 01-99.

(Continued)

*Primary Examiner*—Quochien B Vuong
(74) *Attorney, Agent, or Firm*—Kenneth Vu (57) ABSTRACT

This disclosure is directed to cell acquisition techniques for telecommunication systems that implement FDMA and TDMA techniques, such as GSM systems. The techniques make efficient use of processing time in order to accelerate the cell acquisition process. Upon acquiring synchronization information of a first cell of an FDMA system, the timing for the acquisition of cell identification (ID) information associated with the first cell can be scheduled based on the synchronization information of the first cell. Synchronization information of a second cell of the FDMA system can then be acquired prior to acquiring the cell ID information associated with the first cell. Moreover, synchronization information of a additional cells may similarly be acquired prior to acquiring the cell ID information associated with the first cell. In this manner, efficient use of processing time can be achieved between the acquisition of synchronization information and the acquisition of cell ID information.

37 Claims, 5 Drawing Sheets

U.S. PATENT DOCUMENTS

| | | | |
|---|---|---|---|
| 6,473,602 | B1 | 10/2002 | Bottomley |
| 6,480,558 | B1 | 11/2002 | Ottosson et al. |
| 6,606,494 | B1 | 8/2003 | Arpee et al. |
| 6,614,806 | B1 | 9/2003 | Nanni |
| 6,724,813 | B1 * | 4/2004 | Jamal et al. ................. 455/450 |
| 2002/0136272 | A1 | 9/2002 | Kanterakis et al ........... 375/141 |
| 2003/0123400 | A1 | 7/2003 | Kloos et al. |
| 2003/0224790 | A1 | 12/2003 | Choi |
| 2005/0032542 | A1 | 2/2005 | Wilborn et al. |
| 2005/0047429 | A1 | 3/2005 | Koo et al. |
| 2005/0063331 | A1 | 3/2005 | Kim et al. |
| 2005/0265293 | A1 | 12/2005 | Ro et al. |

FOREIGN PATENT DOCUMENTS

| | | |
|---|---|---|
| RU | 2197792 | 1/2003 |
| RU | 2198474 | 2/2003 |
| WO | 0172080 | 9/2001 |
| WO | WO0215444 | 2/2002 |

OTHER PUBLICATIONS

Digital Cellular Telecommunications System (Phase 2+); Functions Related to Mobile Station (MS) in Idle Mode and Group Receive Mode (Apr. 2000) ETSI TS 100 930 C8.3.0 pp. 02-22.

International Search Report, PCT/US04/030971, International Search Authority, European Patent Office, Jan. 13, 2005.

International Search Report, PCT/US2004/033011, International Search Authority, European Patent Office, Jun. 8, 2005.

International Preliminary Examination Report PCT/US04/030971, IPEA/US, Sep. 28, 2006.

Written Opinion PCT/US04/030971 IPA European Patent Office, Apr. 9, 2006.

* cited by examiner

PARALLEL CELL ID ACQUISITION IN FREQUENCY DIVISION MULTIPLE ACCESS SYSTEMS

TECHNICAL FIELD

The disclosure relates to wireless communication and, more particularly, cell selection in wireless communication systems implementing frequency division multiple access (FDMA) and time division multiple access (TDMA).

BACKGROUND

A wide variety of wireless communication techniques have been developed to facilitate wireless telecommunication. In this disclosure, the phrase frequency division multiple access (FDMA) broadly refers to any wireless communication technique in which an allocated frequency spectrum is divided into a plurality of smaller frequency cells. Each cell of the allocated spectrum has a carrier signal that can be modulated with data. Dividing the allocated frequency spectrum into cells can increase the amount of data that can be communicated over the spectrum, and also provides an easy mechanism for apportioning bandwidth to service providers. For example, specific cells may be assigned to specific service providers, and the wireless network of a given service provider may use one or more cells in order to provide service to its subscribers.

In this disclosure, the phrase time division multiple access (TDMA) broadly refers to a wireless communication technique in which frequency cells are divided into time slots. In systems that implement TDMA techniques, different wireless communications are sent during specific time slots, and in some cases, time slots can be allocated for reservation-based communication. In this way, a single frequency cell can support multiple time-divided communication channels.

The global system for mobile communications (GSM) standard, standardized by the European Telecommunication Standards Institute (ETSI), is one example of a system that makes use of FDMA and TDMA techniques. In Europe, for example, frequency bands surrounding 900 megahertz (MHz) and 1800 MHz have been allocated for GSM. The frequency bands surrounding 900 and 1800 MHz are divided by GSM into approximately 548 frequency cells of approximately 200 kilohertz (KHz) per cell. Within each cell, TDMA techniques are implemented, in which time slots are used for time-allocated communication. The different cells can be assigned to different service providers for use in the service providers networks. Some cells are used as network beacons to inform subscriber units which cells are associated with a given network, while other cells are used only for delivering network traffic to and from subscriber units.

One challenge in systems that implement FDMA techniques, such as GSM, is the process of cell selection or acquisition by a subscriber unit. A subscriber unit refers to a device such as a mobile radiotelephone, or the like, which is used by the end user. In an FDMA system, the subscriber unit scans the various cells of the allocated spectrum and measures the power of the cells, looking for the most desirable cell for telecommunication. The most desirable cell is typically a cell associated with the network of the service provider of the subscriber unit, or possibly a cell for which the service provider of the subscriber unit has a favorable roaming agreement. Cells having higher power signals are also more desirable to a given subscriber unit than lower power cells, e.g., when choosing between cells in the network of a given service provider.

SUMMARY

In one embodiment, this disclosure describes a method comprising acquiring synchronization information of a first cell of a frequency division multiple access (FDMA) system, scheduling a time for acquisition of cell identification (ID) information associated with the first cell based on the synchronization information of the first cell, and acquiring synchronization information of a second cell of the FDMA system prior to acquiring the cell ID information associated with the first cell.

In another embodiment, this disclosure describes a subscriber unit of an FDMA system comprising a receiver to receive a first signal associated with a first cell the FDMA system and a second signal associated with a second cell of the FDMA system, and a control unit to acquire synchronization information of the first cell, schedule a time for acquisition of cell ID information associated with the first cell based on the synchronization information of the first cell, and acquire synchronization information of the second cell prior to acquiring the cell ID information associated with the first cell.

In another embodiment, this disclosure describes a computer-readable medium comprising instructions to cause a subscriber unit of an FDMA system to acquire synchronization information of a first cell of the FDMA system, schedule a time for acquisition of cell ID information associated with the first cell based on the synchronization information of the first cell, and acquire synchronization information of a second cell of the FDMA system prior to acquiring the cell ID information associated with the first cell.

In another embodiment, this disclosure describes a subscriber unit of an FDMA system comprising means for acquiring synchronization information of a first cell of the FDMA system, means for scheduling a time for acquisition of cell ID information associated with the first cell based on the synchronization information of the first cell, and means for acquiring synchronization information of a second cell of the FDMA system prior to acquiring the cell ID information associated with the first cell.

In another embodiment, this disclosure describes a method implemented in a global systems for mobile communications (GSM) system. The method includes acquiring a frequency correction channel (FCCH) and a synchronization channel (SCH) of a first cell, scheduling a time for decoding of a broadcast channel (BCCH) associated with the first cell based on SCH of the first cell, and acquiring an FCCH and an SCH of a second cell prior to decoding the BCCH associated with the first cell.

The details of one or more embodiments are set forth in the accompanying drawings and the description below. Other features, objects, and advantages will be apparent from the description and drawings, and from the claims.

DETAILED DESCRIPTION

This disclosure is directed to cell acquisition techniques for telecommunication systems that implement FDMA and TDMA techniques, such as GSM systems. The techniques make efficient use of processing time, in order to accelerate the cell acquisition process. For example, upon acquiring synchronization information of a first cell of an FDMA system, the timing for the acquisition of cell identification (ID) information associated with the first cell can be scheduled based on the synchronization information of the first cell. Synchronization information of a second cell of the FDMA system can then be acquired prior to acquiring the cell ID information associated with the first cell.

In other words, rather than acquiring synchronization information of a cell, and then waiting for the cell ID information, the techniques described herein make more efficient use of the processing time between the acquisition of synchronization information and the acquisition of cell ID information for a given cell. In particular, the techniques exploit the time between the acquisition of synchronization information for a first cell and the acquisition of cell ID information for the first cell in order to acquire synchronization information for a second cell, and possibly a third cell, a fourth cell, a fifth cell, and so forth.

Acquisition of the cell ID information for the various cells can then be performed according to a scheduling scheme, which identifies when the ID information will be received. In GSM, the time between obtaining synchronization information for a given cell and obtaining the cell ID can take up a second, due to the repetition of messages needed to obtain the cell ID. On the other hand, the time it takes to acquire the synchronization information is typically less than 50-100 ms. Parallel cell ID acquisition can accelerate the process of identifying a desirable cell for registration of a subscriber unit and make more efficient use of processing time.

Figure 1:
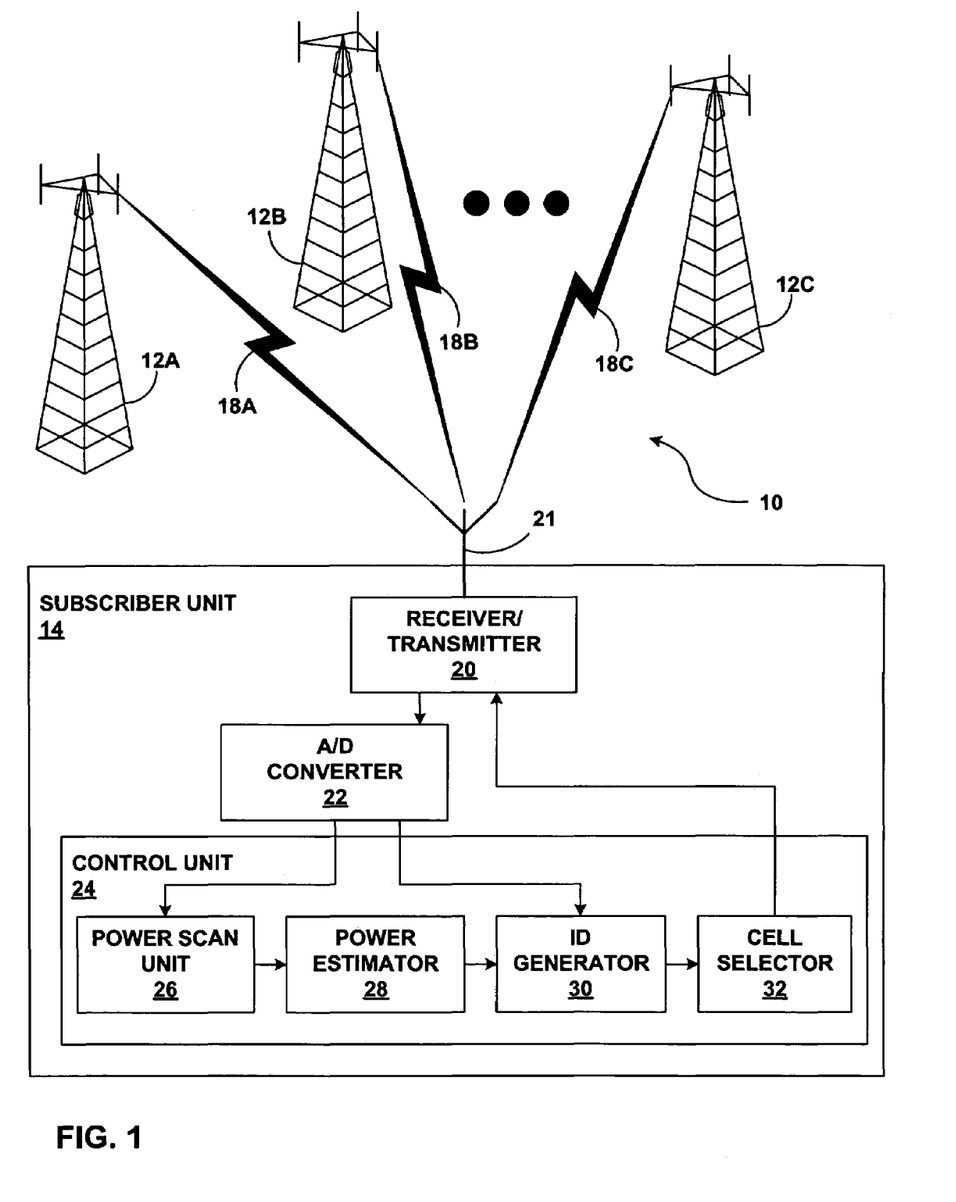
FIG. 1 is a block diagram illustrating a wireless communication system implementing FDMA and TDMA communication techniques according to the teaching of this disclosure.

FIG. 1 is a block diagram illustrating a wireless communication system 10 implementing frequency division multiple access (FDMA) communication techniques as well as time division multiple access (TDMA) techniques. For example, system 10 may comprise a global system for mobile communications (GSM) system, in accordance with the European Telecommunication Standards Institute (ETSI) GSM standard. The ETSI GSM standard makes use of FDMA techniques in which a frequency band is divided into a plurality of cells, as well as TDMA techniques in which time-allocated communication is used during specific time slots within the cells. In the description that follows, many techniques are described in the context of GSM. However, the same or similar techniques could also be used with a wide variety of other wireless protocols or standards that make use of FDMA and TDMA.

Wireless communication system 10 includes a plurality of base stations 12A-12C (collectively base stations 12) that communicate with a subscriber unit 14. Although a single subscriber unit 14 is illustrated, system 10 typically includes a plurality of such units. Subscriber unit 14 generally refers to a wireless device used by an end user. For example, in a GSM system, subscriber unit 14 typically comprises a mobile radiotelephone. However, subscriber unit 14 could also be implemented in any of a wide variety of other portable computing devices such as a desktop or portable computer, a personal digital assistant (PDA), an interactive television, a wireless data terminal, a wireless data collection device, or any other wireless device configured to communicate in accordance with the techniques described in this disclosure.

Base stations 12 are generally stationary equipment that wirelessly communicate with subscriber unit 14 in order to provide network access to subscriber unit 14. For example, base stations 12 may provide an interface between subscriber unit 14 and a public switched telephone network (PSTN) such that telephone calls can be routed to and from subscriber unit 14. Alternatively or additionally, base stations 12 may be coupled to a packet-based network for transmission of packet-based voice information or packet-based data. Base stations 12 are sometimes referred to as base transceiver systems (BTS).

Wireless communication system 10 operates according to FDMA communication techniques and TDMA communication techniques. Frequency division multiple access (FDMA) refers to a wireless communication technique in which an allocated frequency spectrum is divided into a plurality of smaller frequency "cells." Each cell of the allocated spectrum has a carrier signal that can be modulated with data. Each of base stations 12 typically operate in a different frequency cell of the allocated spectrum. For example; each of base stations 12 may be operated by different service providers, and each respective service provider associated with respective base stations 12 can use its cell or cells to provide service to its subscribers.

Time division multiple access (TDMA) refers to a wireless communication technique in which frequency cells are divided into time slots. In systems that implement TDMA techniques, different wireless communications are sent during specific time slots, and in some cases, time slots can be reserved for reservation-based communication. In this way, a single frequency cell can support multiple time-divided communication channels. Within each cell associated with each of base stations 12, TDMA techniques may be employed.

One challenge in systems that implement FDMA and TDMA techniques such as system 10, is the process of cell selection or acquisition by subscriber unit 14. During the cell selection process, subscriber unit 14 identifies a desirable cell that can provide network access to subscriber unit 14. If only one of base stations 12 is operated by the network provider of subscriber unit 14, subscriber unit 14 should identify the cell associated with that base station as the desirable communication cell. On the other hand, if two or more of base stations 12 are operated by the network provider of subscriber unit 14, subscriber unit 14 should identify the cell of that network provider for which the received signal strength is highest. If none of base stations 12 are operated by the network provider of subscriber unit 14, subscriber unit 14 should identify a cell based on other priorities. For example, if none of base stations 12 are operated by the network provider of subscriber unit 14, subscriber unit 14 may select a cell operated by a different network provider for which a favorable roaming agreement is in place. Other types of priorities could also be used.

In FIG. 1, the illustrated components of subscriber unit 14 are specifically those components used in the cell selection process. Numerous other components exist for other functions, such as signal encoding and demodulation. For simplicity, however, the additional components are not illustrated.

Receiver/transmitter 20 receives wireless signals 18A-18C (collectively signals 18) from base stations 12 via antenna 21. Receiver/transmitter 20 may also perform various analog signal conditioning functions on received signals, such as filtering or scaling the signals. Receiver/transmitter 20 separates the different signals associated with the various cells of system 10. Receiver/transmitter 20 then forwards received signals to analog-to-digital (A/D) converter 22, which samples the signals to generate digital values indicative of the received analog signals, i.e., digital signals. The digital signals are then passed from A/D converter 22 to control unit 24, which performs a cell selection process as described herein.

Control unit 24 may include a number of functional components, e.g., implemented in hardware, software, firmware, or the like, in order to perform the cell selection process. For example, control unit 24 may include a power scan unit 26, a power estimator 28, an ID generator 30 and a cell selector 32. Control unit 24 can be implemented as a digital signal processor (DSP) executing software modules, a programmable microprocessor, or discrete hardware components. Also, control unit 24 may be implemented in any combination of hardware, software, firmware, one or more programmable microprocessors, digital signal processors, or the like. The various components of control unit 24 are illustrated for purposes of explanation, but may be integrated with other components, e.g., within hardware or software. If implemented in software, a memory or other computer-readable medium (not shown) may be coupled to control unit 24 in order to store the software instructions loaded into control unit 24 for execution.

Power scan unit 26 scans the cells of an allocated frequency spectrum in order to identify the different signals that were separated by transmitter/receiver 20 for the different cells. For example, transmitter/receiver 20 can separate the various signals associated with the various cells, and in that case, power scan unit 26 scans the separated signals to identify the different signals and enable subsequent processing of such signals. Again, in GSM, the frequency bands surrounding 900 MHz and 1800 MHz are divided into approximately 548 frequency cells of approximately 200 KHz per cell. In that case, transmitter/receiver 20 separates the signals associated with each of the 548 cells. Power scan unit 26 scans the 548 cells in order to identify and distinguish the cells, and allow subsequent power estimates to be made for the cells.

In any case, power estimator 28 measures and estimates the power of the signals of the various cells scanned by power scan unit 26. Power estimator 28 also maintains a list of the cells, in an order of estimated power of the different cells from the highest power cell to the lowest power cell.

ID generator 30 uses the ordered list maintained by power estimator 28. In particular, ID generator begins with the highest power cell in the list and acquires the cell ID for that cell. In GSM, the cell ID acquisition process is a multi-step process involving identification of various channels or codes for a given cell. For example, for a given cell in GSM, ID generator 30 acquires a frequency correction channel (FCCH), which can be used for rough synchronization to the cell. ID generator 30 then acquires a synchronization channel (SCH), which provides basic timing information about the relevant base station 12 associated with the respective cell. Once ID generator 30 has the SCH, it can decode the overhead channels such as the broadcast channel (BCCH) in order to identify the public land mobile network (PLMN) code, which identifies the network associated with the given cell.

In accordance with this disclosure, ID generator 30 can be designed to make efficient use of processing time in order to accelerate the cell acquisition process. In particular, upon acquiring synchronization information of a first cell of an FDMA system, e.g. the FCCH and SCH, ID generator 30 schedules the timing for the acquisition of cell ID information, e.g., the decoding of the BCCH and identification of the PLMN code associated with the first cell. ID generator 30 then acquires synchronization information of a second cell of the FDMA system, e.g., the FCCH and SCH of the second cell, prior to acquiring the cell ID information, e.g., the BCCH and PLMN code associated with the first cell.

In other words, rather than acquiring synchronization information of a cell, and then waiting to acquire the cell ID information for that cell, ID generator 30 makes more efficient use of the processing time between the acquisition of synchronization information and the acquisition of cell ID information for a given cell. In particular, ID generator 30 exploits the time between the acquisition of synchronization information for a first cell and the acquisition of cell ID information for the first cell in order to acquire synchronization information for a second cell, and possibly a third cell, a fourth cell, a fifth cell, and so forth. In this manner, the cell acquisition process can be accelerated in subscriber unit 14.

Cell selector 32 receives the generated network ID's, e.g., the PLMN codes obtained from each BCCH, and selects a desirable cell for use by subscriber unit 14 in subsequent telecommunication. Cell selector 32 may implement a priority scheme in which highest power cells associated with specific networks are selected, but other cells can be selected if the cells associated with the specific network are not strong enough. For example, if none of base stations 12 are operated by the network provider of subscriber unit 14, cell selector 32 may select a cell operated by a different network provider for which a good roaming agreement is in place. Cell selector 32 then instructs receiver/transmitter 20 to communicate with the base station of the selected cell in order to register for subsequent telecommunication with the respective base station. Ordinarily, there will be a strong preference toward usage of a cell associated with the network provider of subscriber unit 14. Nevertheless, a selected cell must meet the minimum power requirements for reliable communication.

Moreover, in accordance with this disclosure, cell selector 32 may also account for the possibility that a generated network 11D is not associated with the highest power cell currently being processed. For example, in some cases, in accordance with this disclosure, decoding of the BCCH for a second cell may be scheduled prior to decoding of the BCCH for a first cell, wherein the second cell has a lower power than the first cell. In that case, cell selector 32 may wait until decoding of the BCCH for the first (higher power) cell is performed before making the cell selection, because the first cell may be preferred over the second cell.

Figure 2:
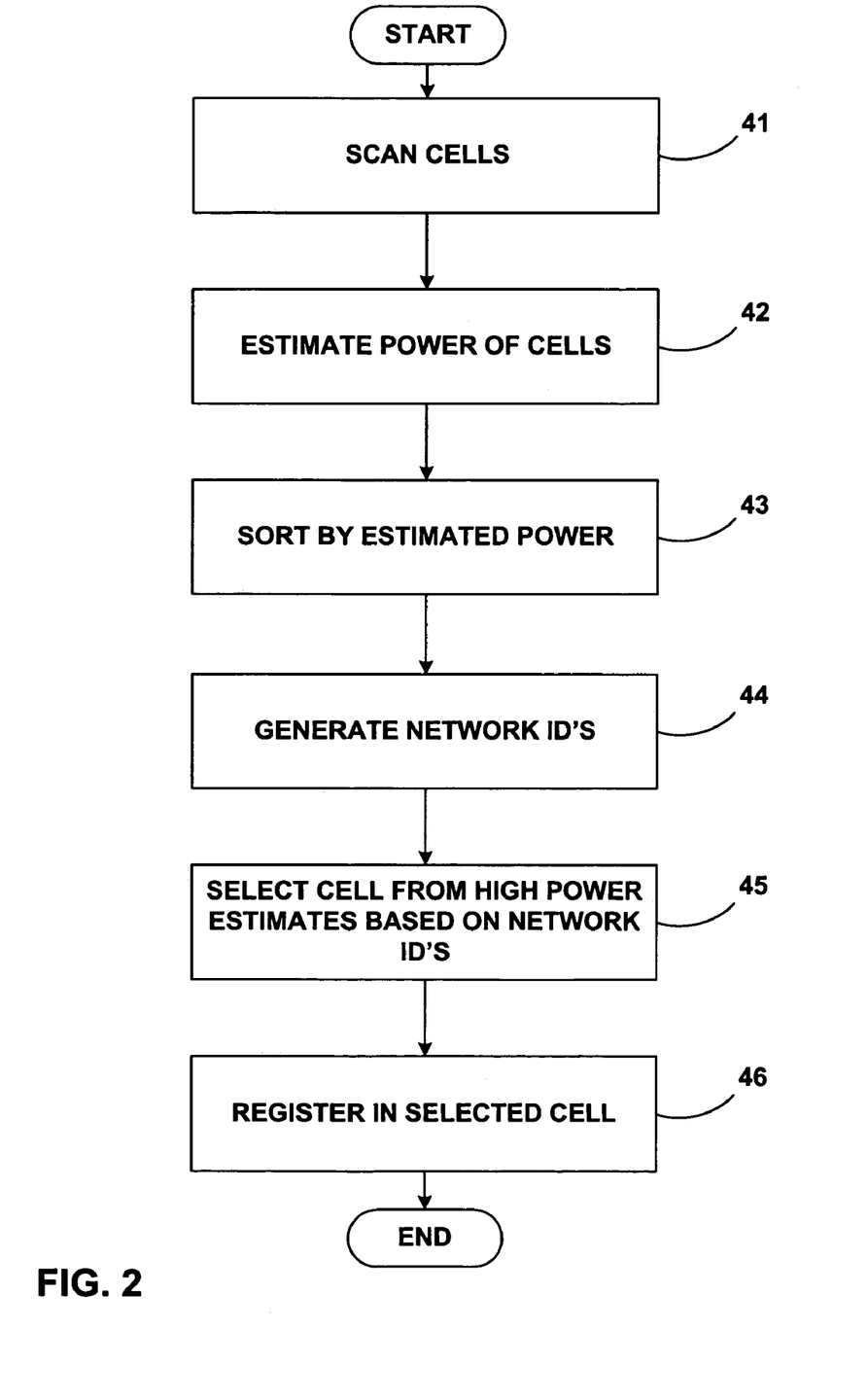
FIG. 2 is a flow diagram illustrating a cell selection process implemented by a subscriber unit of a wireless communication system.

FIG. 2 is a flow diagram illustrating the cell selection process implemented by subscriber unit 14. As shown in FIG. 2, power scan unit 26 scans the cells of an FDMA frequency spectrum (41), e.g., after the signals of the different cells have been separated by transmitter/receiver 20. Power estimator 28 then estimates the power of the different cells (42), possibly accounting for effects which could tend to undermine the reliability of power measurements of power estimator 28.

Power estimator 28 sorts the cells based on estimated power of the cells (43). In particular, power estimator 28 generates a list of cells from highest to lowest in estimated power. ID generator 30 generates network ID's for the cells (44), and cell selector 32 selects a desirable cell based on the network ID's and the estimated power levels (45). For example, ID generator 30 may generate network ID's beginning with the highest power cells, making use of parallel processing techniques, as described herein, in order to accelerate the cell selection process. Once cell selector 32 identifies a network ID associated with the service provider of subscriber unit 14, the cell associated with that network ID can be selected, assuming it is the highest power cell for that service provider and the power level of the cell is sufficient. At that point, the ID generation process can be terminated.

In conventional systems, the acquisition of FCCH, SCH, and decoding of the BCCH to obtain the PLMN is performed for each cell, before moving on to the next cell, in order of measured power. A better approach, however, is to exploit the TDMA nature of GSM cells, and schedule decoding of the BCCH to obtain the PLMN once the FCCH and SCH have been acquired for any given cell. If, after acquiring the FCCH and SCH for a given cell, it is determined that the BCCH will not appear for X milliseconds, those X milliseconds can be used to acquire the FCCH and SCH for the next cell, in order of measured power.

This process can continue indefinitely, giving processing precedence to any scheduled decoding of a BCCH for a cell, but using any unused processing time to acquire the FCCH and SCH for other cells, and then queue decoding of the BCCH for those other cells in the scheduling. For example, in GSM, the time between obtaining synchronization information for a given cell and obtaining the cell 1D can take up a second due to the repetition of messages needed to obtain the cell ID. On the other hand, the time it takes to acquire the synchronization information is typically less than 50-100 ms. Accordingly, parallel cell ID acquisition can accelerate the process of identifying a desirable cell for registration of a subscriber unit.

Figure 3:
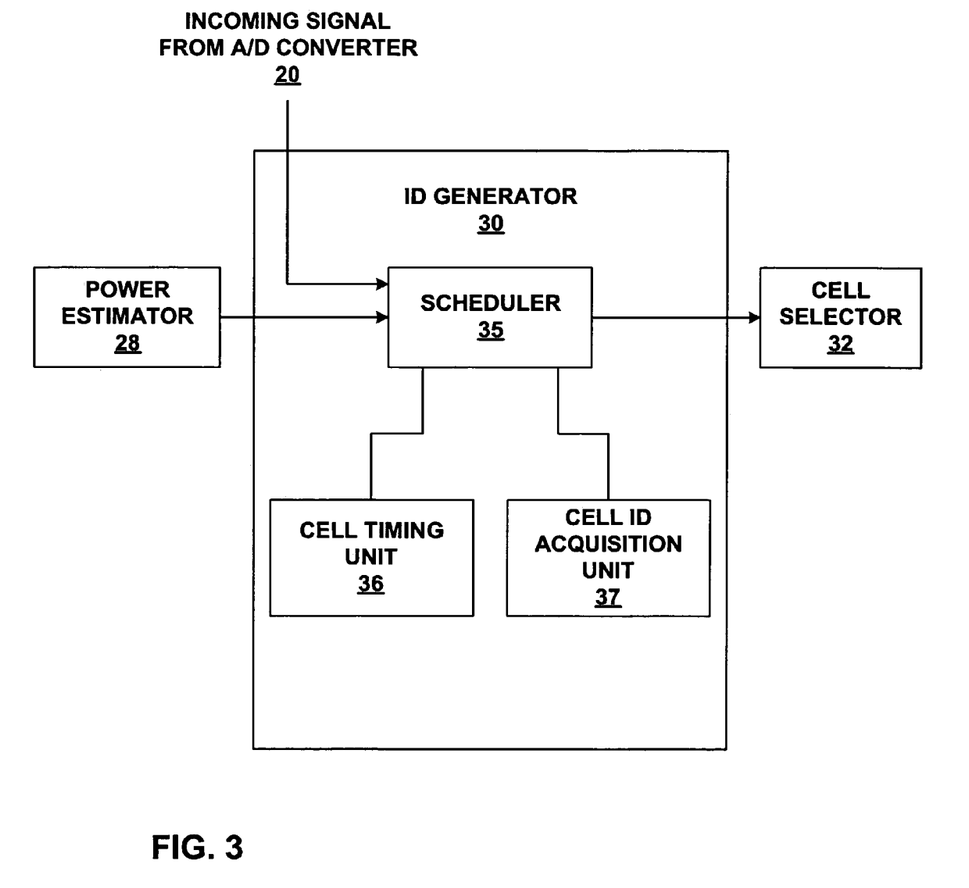
FIG. 3 is a more detailed block diagram of specific components of the subscriber unit illustrated in FIG. 1, in accordance with this disclosure.

FIG. 3 is a more specific exemplary block diagram of the power estimator 28, ID generator 30 and cell selector 32 of subscriber unit 14 (FIG. 1). Power estimator 28 measures and estimates the power of the various cells in an FDMA system such as GSM. Based on its power measurements, power estimator 28 maintains a list of the cells, in an order of estimated power of the different cells from the highest power cell to the lowest power cell.

ID generator 30 receives the incoming signals from A/D converter 20, and is designed to make efficient use of processing time in order to accelerate the cell acquisition process. In this example, ID generator 30 includes a scheduler 35, a cell timing unit 36, and a cell ID acquisition unit 37, although the functionality of such components could be integrated. ID generator 30 makes use of the ordered list of the cells (ordered based on power) maintained by power estimator 28. Scheduler 35 coordinates the different stages of the cell acquisition process for every given cell, taking advantage of the TDMA nature of the received signals for each cell.

Beginning with the highest power cell in the ordered list of the cells maintained by power estimator 28, scheduler 35 invokes cell timing unit 36 to acquire synchronization information. Cell timing unit 36 acquires the synchronization information for that cell, e.g., in the case of GSM, the FCCH and SCH for that cell. In GSM, the acquisition of the FCCH and SCH typically takes less than approximately 100 milliseconds.

Based on the FCCH and SCH acquired for the current cell, scheduler 35 determines if cell ID information, e.g., a BCCH, exists for that cell. If so, identification of the desired BCCH can be between 0 and 1 second, depending on the TDMA cycle for that cell. In accordance with this disclosure, scheduler 35 schedules decoding of the BCCH for the current cell, and if enough time exists before the decoding of the BCCH, scheduler re-invokes cell timing unit 36 to acquire synchronization information for the next cell in the ordered list of cells maintained by power estimator 28, prior to invoking cell ID acquisition unit 37 to decode the BCCH for the first cell. Once the scheduled time arrives for decoding of the BCCH for the first cell, scheduler 35 invokes cell ID acquisition unit 37 to decode the BCCH. In this manner, ID generator 30 makes efficient use of processing time, in order to accelerate the cell acquisition process.

In other words, rather than acquiring synchronization information of a cell, and then waiting to acquire the cell ID information for that cell, ID generator 30 makes more efficient use of the processing time between the acquisition of synchronization information and the acquisition of cell ID information for a given cell. Scheduler 35 coordinates the processing, giving processing precedence to any scheduled decoding of a BCCH for a cell, but using any unused processing time to acquire the FCCH and SCH for other lower power cells, and then queuing the decoding of the BCCH for those other cells in the scheduling scheme.

As outlined above, cell selector 32 receives the generated network ID's, e.g., the PLMN codes obtained from each BCCH, and selects a desirable cell for use by subscriber unit 14 (FIG. 1) in subsequent telecommunication. Cell selector 32 can implement a priority scheme in which highest power cells associated with specific networks are selected, but other cells can be selected if the cells associated with the specific network are not strong enough. For example, if none of base stations 12 are operated by the network provider of subscriber unit 14, cell selector 32 may select a cell operated by a different network provider for which a good roaming agreement is in place. Cell selector 32 then instructs receiver/transmitter 30 to communicate with the base station of the selected cell in order to register for subsequent telecommunication with the respective base station in the selected cell.

Also, in accordance with this disclosure, cell selector 32 may account for the possibility that a generated network ID is not associated with the highest power cell currently being processed. For example, in some cases, in accordance with this disclosure, decoding of the BCCH for a second cell may be scheduled prior to decoding of the BCCH for a first cell, wherein the second cell has a lower power than the first cell. In that case, cell selector 32 may wait until decoding of the BCCH for the first (higher power) cell is performed before making the cell selection, because the first cell may be preferred over the second cell.

Figure 4:
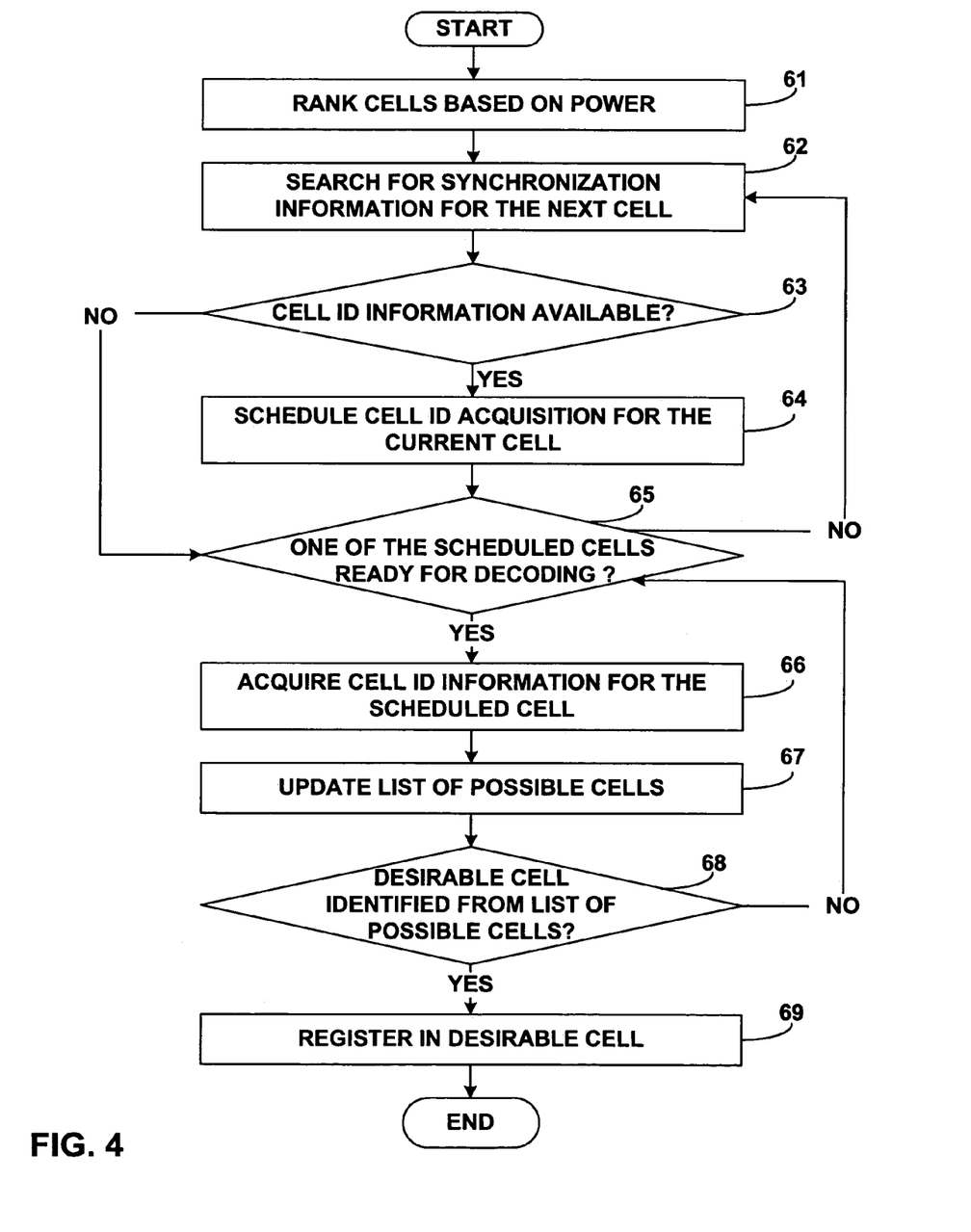
FIGS. 4 and 5 are a flow diagrams illustrating processes implemented within a subscriber unit in accordance with this disclosure.

FIG. 4 is a flow diagram illustrating a process implemented within subscriber unit 14 in accordance with this disclosure. As illustrated in FIG. 4, power estimator 28 ranks cells of an FDMA system based on power (61). Beginning with the highest power cell, ID generator 30 searches for synchronization information for the next cell (62). For example, scheduler 35 can invoke cell timing unit 36 in order to obtain the FCCH and SCCH for that cell. Based on the synchronization information, scheduler 35 determines if cell ID information, e.g., a BCCH exists for that cell (63). If so (yes branch of 63), scheduler 35 schedules cell ID acquisition for that cell based on the synchronization information for that cell (64).

At this point, if scheduler 35 determines that none of the cells that are scheduled for cell ID acquisition (no branch of 65) are ready to be decoded, the process (steps 62-65) is repeated for the next cell, i.e., the next most powerful cell. In other words, rather than acquiring synchronization information of a cell, and then waiting to acquire the cell ID information for that cell, ID generator 30 makes more efficient use of the processing time between the acquisition of synchronization information and the acquisition of cell ID information for a given cell. In particular, ID generator 30 exploits the time between the acquisition of synchronization information for a first cell and the acquisition of cell ID information for the first cell in order to acquire synchronization information for a second cell, and possibly a third cell, a fourth cell, a fifth cell, and so forth. In this manner, the cell acquisition process can be accelerated in subscriber unit 14.

Once a scheduled time arrives for acquisition of the cell ID information for a given one of the cells (yes branch of 65), scheduler 35 invokes cell ID acquisition unit 37 to acquire the cell ID information (66), which may include the PLMN code for that scheduled cell. In that case, cell ID acquisition unit 37 acquires cell ID information, i.e., the PLMN code for that scheduled cell, and scheduler 35 updates a list of possible cells that may be used for telecommunication to include the cell identified by the PLMN code for that scheduled cell (67). In particular, cell ID acquisition unit decodes the BCCH for the given cell in order to acquire the PLMN code.

Cell selector 32 determines whether a desirable cell can be identified from the list of possible cells maintained in scheduler 35 (68), and if so, causes receiver/transmitter 20 (FIG. 1) to register subscriber unit 14 in that cell (69). The desirable cell can then be used by subscriber unit 14 for telecommunication.

In accordance with this disclosure, in some cases, a desirable cell may not be identifiable after acquiring the cell ID information for a given cell (no branch of 68), e.g., if a higher power cell than the given cell is still scheduled for cell ID acquisition. In this manner, cell selector 32 can account for the possibility that a generated network ID is not associated with the highest power cell currently being processed. For example, decoding of the BCCH for a second cell may be scheduled prior to decoding of the BCCH for a first cell, wherein the second cell has a lower power than the first cell. In that case, the process of FIG. 4 continues until decoding of the BCCH for the first (higher power) cell is performed before making the cell selection, because the first cell may be preferred over the second cell.

Another situation during which the parallel acquisition and decoding described herein may be used is a scenario where a user manually instructs the subscriber unit to display all available networks. In that case, the subscriber unit will not stop acquiring the PCCH's and SCH's and decoding the BCCH's in parallel, until the subscriber unit identifies all the cells above a threshold power level. In contrast, in normal acquisition, the subscriber unit generally stops decoding as soon as the desirable network is identified. However, when a user manually instructs the subscriber unit to display all available networks, decoding generally continues even if a particular network or cell is identified.

Figure 5:
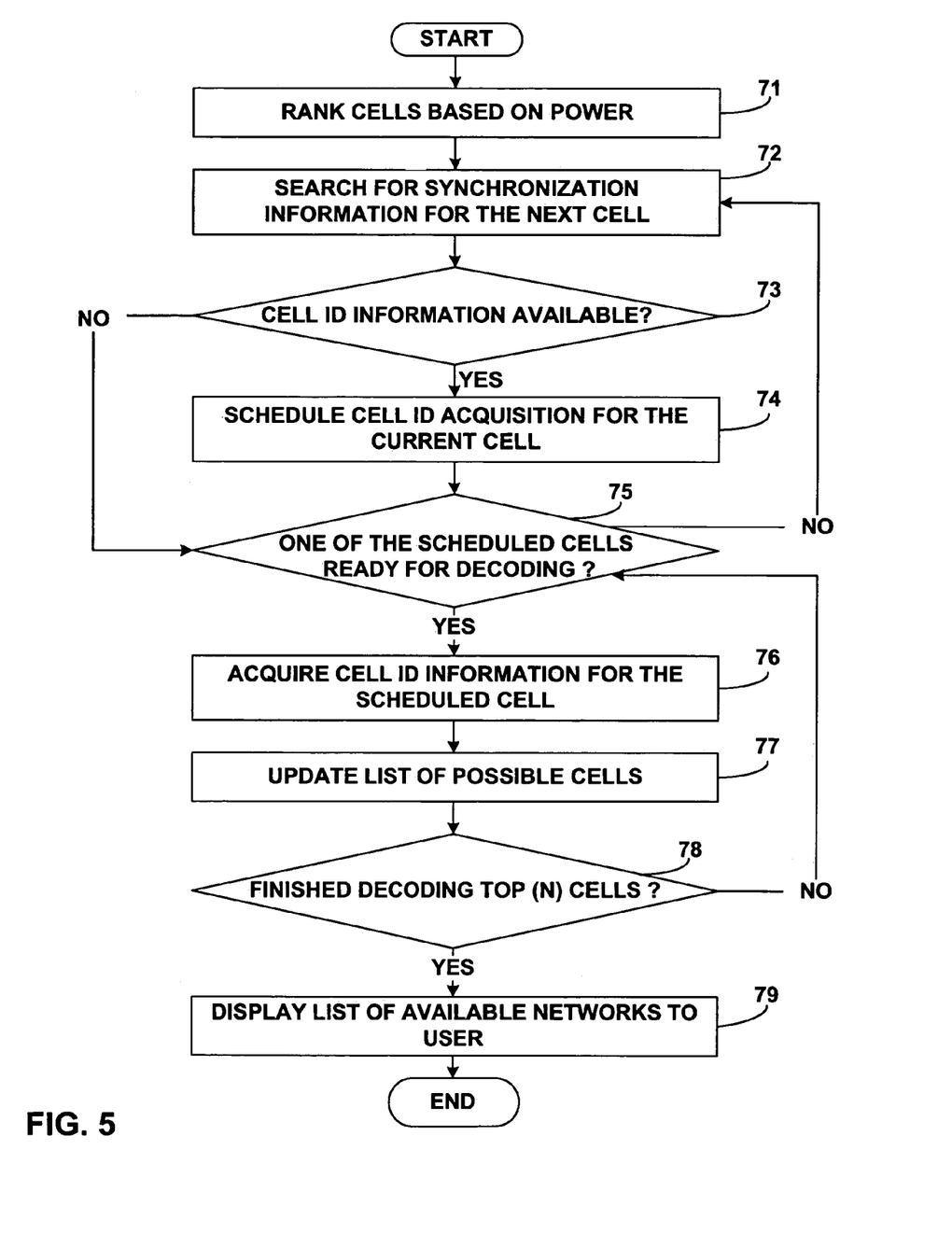

FIG. 5 is another flow diagram according to an embodiment of this disclosure in which a user manually instructs subscriber unit 14 to display all available networks. As illustrated in FIG. 5, power estimator 28 ranks cells of an FDMA system based on power (71). Beginning with the highest power cell, ID generator 30 searches for synchronization information for the next cell (72). For example, scheduler 35 can invoke cell timing unit 36 in order to obtain the FCCH and SCCH for that cell. Based on the synchronization information, scheduler 35 determines if cell 1D information, e.g., a BCCH exists for that cell (73). If so (yes branch of 73), scheduler 35 schedules cell ID acquisition for that cell based on the synchronization information for that cell (74).

At this point, if scheduler 35 determines that none of the cells that are scheduled for cell ID acquisition (no branch of 75) are ready to be decoded, the process (steps 72-75) is repeated for the next cell, i.e., the next most powerful cell. In other words, rather than acquiring synchronization information of a cell, and then waiting to acquire the cell ID information for that cell, ID generator 30 makes more efficient use of the processing time between the acquisition of synchronization information and the acquisition of cell ID information for a given cell. In particular, ID generator 30 exploits the time between the acquisition of synchronization information for a first cell and the acquisition of cell ID information for the first cell in order to acquire synchronization information for a second cell, and possibly a third cell, a fourth cell, a fifth cell, and so forth. In this manner, the cell acquisition process can be accelerated in subscriber unit 14.

Once a scheduled time arrives for acquisition of the cell ID information for a given one of the cells (yes branch of 75), scheduler 35 invokes cell ID acquisition unit 37 to acquire cell ID information (76), which may include the PLMN code for that scheduled cell. In that case, cell ID acquisition unit 37 acquires the cell ID information, i.e., the PLMN code for that scheduled cell, and scheduler 35 updates a list of possible cells that may be used for telecommunication to include the cell identified by the PLMN code for that scheduled cell (77).

Cell selector 32 determines whether the top N cells in scheduler 35 have been decoded (78). If the top N cells have not been decoded (no branch of 78), e.g., if a another high power cell is still scheduled for cell ID acquisition, then the process continues. The top N cells refer to the cells over some threshold power level that makes the cells candidate networks for subscriber unit 14. Once the top N cells in scheduler 35 have been decoded, subscriber unit 14 displays a list of candidate networks or cells to the user (79). The user, then, may manually select a desirable cell the list of candidates, and manually cause subscriber unit 14 to register in that cell for telecommunication. By performing parallel acquisition and decoding during generation of the list of candidate cells, the process can be accelerated relative to conventional techniques of generating lists of candidate cells.

A number of embodiments have been described. In particular, techniques have been described for making more efficient use of processing time, in order to accelerate the cell acquisition process. The techniques may be implemented in a subscriber unit in hardware, software, firmware, or the like, in order to perform cell selection as described herein. Example hardware implementations may include implementations within a digital signal processor (DSP), an application specific integrated circuit (ASIC), a field programmable gate array (FPGA), a programmable logic device, specifically designed hardware components, or any combination thereof. In addition, one or more of the techniques described herein may be partially or wholly executed in software. In that case, a computer readable medium may store or otherwise comprise computer readable instructions, i.e., program code that can be executed by a processor or DSP of a subscriber unit to carry out one of more of the techniques described above.

For example, the computer readable medium may comprise random access memory (RAM), read-only memory (ROM), non-volatile random access memory (NVRAM), electrically erasable programmable read-only memory (EEPROM), flash memory, or the like, coupled to control unit 24 of subscriber unit 14. In that case, control unit 24 may comprise a processor or DSP that executes various software modules stored in the computer readable medium. Numerous other modifications may be made without departing from the spirit and scope of this disclosure. Accordingly, these and other embodiments are within the scope of the following claims.

The invention claimed is:

1. A method comprising:
acquiring synchronization information of a first cell of a wireless communication system;
scheduling time for acquisition of cell identification (ID) information associated with the first cell based on the synchronization information of the first cell; and
acquiring synchronization information of a second cell of the wireless communication system after acquiring the synchronization information of the first cell and prior to acquiring the cell ID information associated with the first cell.

2. The method of claim 1, further comprising acquiring the synchronization information of the second cell of the wireless communication system prior to acquiring the cell ID information associated with the first cell only when enough time exists for acquiring the synchronization information of the second cell before the scheduled time for acquisition of cell ID information associated with the first cell.

3. The method of claim 1, further comprising:
scheduling time for acquisition of cell ID information associated with the second cell based on the synchronization information of the second cell; and
acquiring synchronization information of a third cell of the wireless communication system prior to acquiring the cell ID information associated with the second cell.

4. The method of claim 3, further comprising acquiring synchronization information of the third cell of the wireless communication system prior to acquiring the cell ID information associated with the first cell.

5. The method of claim 1, further comprising acquiring the cell ID information associated with the first cell at the scheduled time following the acquisition of synchronization information of the second cell.

6. The method of claim 5, further comprising selecting or rejecting the first cell based on the cell ID information associated with the first cell.

7. The method of claim 6, further comprising registering in the first cell when the first cell is selected based on the cell ID information associated with the first cell.

8. The method of claim 1, wherein the wireless communication system comprises a global systems for mobile communications (GSM) system, acquiring the synchronization information includes acquiring a frequency correction channel (FCCH) and a synchronization channel (SCH), and acquiring the cell ID information includes acquiring a public land mobile network (PLMN) code from a broadcast channel (BCCH).

9. The method of claim 1, further comprising generating a list of available networks including the first cell and the second cell, based on the cell ID information associated with the first cell and cell ID information associated with the second cell.

10. A subscriber unit comprising:
a receiver to receive a first signal associated with a first cell of a wireless communication system and a second signal associated with a second cell of the wireless communication system; and
a control unit to acquire synchronization information of the first cell, schedule time for acquisition of cell identification (ID) information associated with the first cell based on the synchronization information of the first cell, and acquire synchronization information of the second cell after acquiring the synchronization information of the first cell and prior to acquiring the cell ID information associated with the first cell.

11. The subscriber unit of claim 10, wherein the control unit acquires the synchronization information of the second cell of the wireless communication system prior to acquiring the cell ID information associated with the first cell only when enough time exists for acquiring the synchronization information of the second cell before the scheduled time for acquisition of cell ID information associated with the first cell.

12. The subscriber unit of claim 10, wherein the control unit schedules time for acquisition of cell ID information associated with the second cell based on the synchronization information of the second cell, and acquires synchronization information of a third cell of the wireless communication system prior to acquiring the cell ID information associated with the second cell.

13. The subscriber unit of claim 12, wherein the control unit acquires synchronization information of the third cell of the wireless communication system prior to acquiring the cell ID information associated with the first cell.

14. The subscriber unit of claim 10, wherein the control unit acquires the cell ID information associated with the first cell at the scheduled time.

15. The subscriber unit of claim 14, wherein the control unit selects or rejects the first cell based on the cell ID information associated with the first cell.

16. The subscriber unit of claim 10, wherein the control unit causes the subscriber unit to register in the first cell when the first cell is selected based on the cell ID information associated with the first cell.

17. The subscriber unit of claim 10, wherein the wireless communication system comprises a global systems for mobile communications (GSM) system, acquiring the synchronization information includes acquiring a frequency correction channel (FCCH) and a synchronization channel (SCH), and acquiring the cell ID information includes acquiring a public land mobile network (PLMN) code from a broadcast channel (BCCH).

18. A computer-readable medium stored with instructions executable by a subscriber unit, the instructions to cause the subscriber unit to:
acquire synchronization information of a first cell of a wireless communication system;
schedule time for acquisition of cell identification (ID) information associated with the first cell based on the synchronization information of the first cell; and
acquire synchronization information of a second cell of the wireless communication system after acquiring the synchronization information of the first cell and prior to acquiring the cell ID information associated with the first cell.

19. The computer-readable medium of claim 18, further comprising instructions that cause the subscriber unit to acquire the synchronization information of the second cell of the wireless communication system prior to acquiring the cell ID information associated with the first cell only when enough time exists for acquiring the synchronization information of the second cell before the scheduled time for acquisition of cell ID information associated with the first cell.

20. The computer-readable medium of claim 18, further comprising instructions that cause the subscriber unit to schedule time for acquisition of cell ID information associated with the second cell based on the synchronization information of the second cell, and acquire synchronization information of a third cell of the wireless communication system prior to acquiring the cell ID information associated with the second cell.

21. The computer-readable medium of claim 20, further comprising instructions that cause the subscriber unit to acquire synchronization information of the third cell of the wireless communication system prior to acquiring the cell ID information associated with the first cell.

22. The computer-readable medium of claim 18, further comprising instructions that cause the subscriber unit to acquire the cell ID information associated with the first cell at the scheduled time.

23. The computer-readable medium of claim 22, further comprising instructions that cause the subscriber unit to select or reject the first cell based on the cell ID information associated with the first cell.

24. The computer-readable medium of claim 23, further comprising instructions that cause the subscriber unit to register in the first cell when the first cell is selected based on the cell ID information associated with the first cell.

25. The computer-readable medium of claim 18, wherein the wireless communication system comprises a global systems for mobile communications (GSM) system, acquiring the synchronization information includes acquiring a frequency correction channel (FCCH) and a synchronization channel (SCH), and acquiring the cell ID information includes acquiring a public land mobile network (PLMN) code from a broadcast channel (BCCH).

26. A subscriber unit comprising:
   means for acquiring synchronization information of a first cell of a wireless communication system;
   means for scheduling time for acquisition of cell identification (ID) information associated with the first cell based on the synchronization information of the first cell; and
   means for acquiring synchronization information of a second cell of the wireless communication system after acquiring the synchronization information of the first cell and prior to acquiring the cell ID information associated with the first cell.

27. The subscriber unit of claim 26, further comprising means for acquiring the synchronization information of the second cell of the wireless communication system prior to acquiring the cell ID information associated with the first cell only when enough time exists for acquiring the synchronization information of the second cell before the scheduled time for acquisition of cell ID information associated with the first cell.

28. The subscriber unit of claim 26, further comprising:
   means for scheduling time for acquisition of cell ID information associated with the second cell based on the synchronization information of the second cell; and
   means for acquiring synchronization information of a third cell of the wireless communication system prior to acquiring the cell ID information associated with the second cell.

29. The subscriber unit of claim 28, farther comprising means for acquiring synchronization information of the third cell of the wireless communication system prior to acquiring the cell ID information associated with the first cell.

30. The subscriber unit of claim 26, further comprising means for acquiring the cell ID information associated with the first cell at the scheduled time.

31. The subscriber unit of claim 30, further comprising means for selecting or rejecting the first cell based on the cell ID information associated with the first cell.

32. The subscriber unit of claim 31, farther comprising means for registering in the first cell when the first cell is selected based on the cell ID information associated with the first cell.

33. The subscriber unit of claim 26, wherein the wireless communication system comprises a global systems for mobile communications (GSM) system, acquiring the synchronization information includes acquiring a frequency correction channel (FCCH) and a synchronization channel (SCH), and acquiring the cell ID information includes acquiring a public land mobile network (PLMN) code from a broadcast channel (BCCH).

34. In a global systems for mobile communications (GSM) system, a method comprising:
   acquiring a frequency correction channel (FCCH) and a synchronization channel (SCH) of a first cell;
   scheduling time for decoding of a broadcast channel (BCCH) associated with the first cell based on SCH of the first cell; and
   acquiring an FCCH and an SCH of a second cell after acquiring the FCCH and the SCH of the first cell and prior to decoding the BCCH associated with the first cell.

35. The method of claim 34, further comprising acquiring the FCCH and SCH of the second cell prior to decoding the BCCH associated with the first cell only when enough time exists for acquiring the FCCH and SCH of the second cell before the scheduled time for acquisition of BCCH associated with the first cell.

36. The method of claim 34, wherein decoding the BCCH associated with the first cell includes acquiring a public land mobile network (PLMN) code for the first cell from the BCCH associated with the first cell.

37. The method of claim 34, further comprising:
   scheduling time for decoding of a BCCH associated with the second cell prior to the decoding of the BCCH associated with the first cell.

* * * * *

UNITED STATES PATENT AND TRADEMARK OFFICE
CERTIFICATE OF CORRECTION

PATENT NO.      : 7,620,029 B2
APPLICATION NO. : 10/683640
DATED           : November 17, 2009
INVENTOR(S)     : Rick et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1087 days.

Signed and Sealed this

Fourteenth Day of December, 2010

David J. Kappos
*Director of the United States Patent and Trademark Office*